US010024663B2

(12) United States Patent
Rocchi et al.

(10) Patent No.: US 10,024,663 B2
(45) Date of Patent: *Jul. 17, 2018

(54) MICROMECHANICAL CORIOLIS RATE OF ROTATION SENSOR

(71) Applicant: Maxim Integrated Products, Inc., San Jose, CA (US)

(72) Inventors: Alessandro Rocchi, Rosignano Solvay (IT); Eleonora Marchetti, Montecatini-Terme (IT); Lorenzo Bertini, Pisa (IT)

(73) Assignee: Hanking Electronics, Ltd., Canton, OH (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/048,020

(22) Filed: Feb. 19, 2016

(65) Prior Publication Data

US 2016/0169676 A1 Jun. 16, 2016

Related U.S. Application Data

(63) Continuation of application No. 13/720,217, filed on Dec. 19, 2012, now Pat. No. 9,279,681.

(30) Foreign Application Priority Data

Dec. 23, 2011 (DE) .................. 10 2011 056 971

(51) Int. Cl.
*G01C 19/56* (2012.01)
*G01C 19/04* (2006.01)
(Continued)

(52) U.S. Cl.
CPC ......... *G01C 19/5712* (2013.01); *G01C 19/04* (2013.01); *G01C 19/5747* (2013.01); *Y10T 74/1293* (2015.01)

(58) Field of Classification Search
CPC . G01C 19/04; G01C 19/5712; G01C 19/5747
See application file for complete search history.

(56) References Cited

U.S. PATENT DOCUMENTS

| 5,635,640 A | 6/1997 | Geen |
|---|---|---|
| 6,837,107 B2 | 1/2005 | Geen |

(Continued)

FOREIGN PATENT DOCUMENTS

| CN | 1813194 A | 8/2006 |
|---|---|---|
| CN | 101120232 B | 7/2011 |
| DE | 102010029634 A1 | 12/2011 |

OTHER PUBLICATIONS

Extended European Search Report dated Apr. 14, 2016, in European Patent Application No. 12197111.3-1557 / 2607850 (8pgs).

(Continued)

*Primary Examiner* — Helen Kwok
(74) *Attorney, Agent, or Firm* — Hartman Global IP Law; Gary M. Hartman; Domenica N. S. Hartman (57) ABSTRACT

A micromechanical sensor that can detect shock effects in order to prevent false measurements. The sensor includes a substrate having a measurement axis and a detection axis that are disposed orthogonally to each other, and first and second driving masses disposed in a plane containing the measurement and detection axes. Each of the driving masses is rotatably coupled to the substrate via a central suspension disposed on the detection axis. The sensor includes drive electrodes that generate rotary motions in each of the driving masses about a drive axis thereof. At least one elastic connecting element allows the driving masses to deflect in opposite directions in response to a rate of rotation about the measurement axis but deflect in the same direction in response to a shock condition.

20 Claims, 3 Drawing Sheets

(51) Int. Cl.
*G01C 19/5712* (2012.01)
*G01C 19/5747* (2012.01)

(56) References Cited

U.S. PATENT DOCUMENTS

| | | | |
|---|---|---|---|
| 7,240,552 | B2 | 7/2007 | Acar et al. |
| 7,454,971 | B2 | 11/2008 | Blomqvist |
| 9,506,756 | B2 * | 11/2016 | McNeil .............. G01C 19/5712 |
| 9,759,563 | B2 * | 9/2017 | Loreck .............. G01C 19/5733 |
| 2004/0083812 | A1 | 5/2004 | Ichinose |
| 2004/0211257 | A1 | 10/2004 | Geen |
| 2005/0081633 | A1 * | 4/2005 | Nasiri ................ G01C 19/5712 |
| | | | 73/514.29 |
| 2010/0095768 | A1 | 4/2010 | Acar et al. |
| 2010/0192690 | A1 | 8/2010 | Classen et al. |
| 2011/0023600 | A1 | 2/2011 | Wrede et al. |
| 2011/0030474 | A1 | 2/2011 | Kuang et al. |
| 2012/0011933 | A1 | 1/2012 | Ohms et al. |
| 2012/0017678 | A1 | 1/2012 | Rocchi |
| 2012/0210788 | A1 | 8/2012 | Günther et al. |

OTHER PUBLICATIONS

Ex parte Quayle action dated Feb. 6, 2015, in parent U.S Appl. No. 13/720,217, filed Dec. 19, 2012 (7pgs).
Response to Ex parte Quayle action filed Mar. 26, 2015, in parent U.S. Appl. No. 13/720,217, filed Dec. 19, 2012 (7pgs).
Notice of Allowance dated Nov. 6, 2015, in parent U.S. Appl. No. 13/720,217, filed Dec. 19, 2012 (5pgs).
Search Report dated May 3, 2012, in priority German Application No. 102011056971, filed Dec. 23, 2011 (5pgs).
English Translation of Office Action dated May 5, 2016, in Chinese Patent Application No. 201210563246.0 (16pgs).

* cited by examiner

MICROMECHANICAL CORIOLIS RATE OF ROTATION SENSOR

CROSS-REFERENCE TO RELATED APPLICATIONS

This application is a continuation of copending U.S. patent application Ser. No. 13/720,217, entitled, "Micromechanical coriolis rate of rotation sensor", listing as inventors, Alessandro Rocchi, Eleonora Marchetti, and Lorenzo Bertini, and filed Dec. 19, 2012, which application claims the benefit of German Application No. 102011056971.5, entitled "Mikromechanischer Coriolis-Drehratensensor", listing as inventors, Alessandro Rocchi, Eleonora Marchetti, and Lorenzo Bertini, and filed Dec. 23, 2011, which applications are hereby incorporated herein by reference in their entireties.

BACKGROUND

A. Technical Field

The present invention relates to micromechanical sensors for detecting rates of rotation.

B. Background of the Invention

A generic rate of rotation sensor using MEMS technology and comprising two driving masses is known from U.S. Pat. No. 5,635,640. Both driving masses are attached to a substrate and disposed displaceably relative to said substrate. The two driving masses are coupled to each other by means of a spring, by means of which the rotary motions of the two driving masses about their corresponding centers of rotation is accomplished. The two driving masses are driven to move by the corresponding drive means, identically and generally in antiphase due to the central spring. If the substrate is rotated about a measurement axis, then a Coriolis force acting on the rotationally oscillating driving masses causes the two driving masses to rotate or tip about a detection axis in an equal and opposite manner. An electrical signal is generated by electrodes disposed between the driving masses and the substrate due to said tilting motion and the resulting change in distance between the driving mass and the substrate, allowing a conclusion to be drawn about the rotary motion of the substrate.

Generic Coriolis rate of rotation sensors are used, for example, in vehicles or other devices in which the sensors can be subject to impacts. A disadvantage of the rate of rotation sensors according to the state of the art is that said sensors are relatively sensitive to such external force influences. Imprecise measurements are thereby obtained, or the sensor can even be damaged.

SUMMARY OF THE INVENTION

The object of the present invention is therefore to produce a largely shock resistant rate of rotation sensor that is not sensitive to said external influences due to the mechanical construction thereof, and that can detect shock effects in order to prevent false measurements.

The object is achieved by a micromechanical Coriolis rate of rotation sensor having the characteristics of claim 1.

The micromechanical sensor micromechanical sensor includes a substrate having a measurement axis and a detection axis that are disposed orthogonally to each other, and first and second driving masses disposed in a plane containing the measurement and detection axes. Each of the first and second driving masses is rotatably coupled to the substrate via a central suspension that is disposed on the detection axis. The sensor further includes drive electrodes that generate rotary motions in each of the first and second driving masses about a drive axis thereof that is disposed orthogonally to the measurement and detection axes. The rotary motions cause the first and second driving masses to deflect in opposite directions in response to a rate of rotation about the measurement axis.

In order to produce a rate of rotation sensor that is particularly insensitive to impacts, according to the invention, at least one elastic connecting element is disposed on the driving masses on both sides of the detection axis (Y-axis) and spaced apart from the Y-axis. The two driving masses are thereby connected to each other, and a mutually tuned oscillation of the two driving masses is enabled. Said connecting elements further cause the two driving masses to be deflected in phase, rather than in antiphase, in case of an impact on the rate of rotation sensor. Thus, while the driving masses are displaced in a diametrically opposed manner in normal operation, the two driving masses are deflected in the same direction due to an impact. By coupling the two driving masses by means of the connecting elements, an identical deflection of the two driving masses is thus generated by the shock acting on the rate of rotation sensor. The detecting elements disposed between the substrate and the driving masses will thus generate diametrically opposite signals in normal operation when the substrate is rotated, while the effect of an impact on the rate of rotation sensor is that the detecting elements disposed on the same side of the Y-axis, such as on the left side of the Y-axis, generate identical signals. As soon as such is the case, the analysis of the electrical signals leads to the conclusion that an impact on the sensor has taken place and has falsified the actual measured value of the rate of rotation.

The connecting elements further ensure, as well, that the system is substantially more stable, because the two driving masses mutually affect each other in case of a deflection about the Y-axis in the same direction, and thus significantly reduce the sensitivity with respect to shock conditions on the rate of rotation sensor.

The driving masses comprise an elongation in the direction of the X-axis (measurement axis). The connecting element is advantageously attached at the outermost end of the driving mass, as seen in the direction of the X-axis, for such an embodiment of the driving mass. A relatively great deflection of the connecting element is thereby obtained when the driving masses oscillate about the drive axis. When a shock condition occurs, the force exerted by the two driving masses on each other is thereby also most effective, because a large lever arm is achieved with respect to the central suspension and axis of rotation of the driving masses.

In an advantageous embodiment of the connecting element, said element comprises cantilevers and elastic connecting springs. The mutual interaction can hereby be affected in a targeted manner. In particular, the design of the connecting springs and the cantilevers can influence the oscillation of the two driving masses in antiphase to each other. The connecting springs are thereby disposed advantageously so that they are compressed at the ends of the driving masses moving toward each other and are stretched at the opposite ends, at which the two driving masses are moving away from each other at the same time. Said springs are implemented as very elastic in the X-Y plane in a corresponding design. With respect to a deflection in the Z-direction, they allow deflection of the two driving masses for normal operation that is also diametrically opposite, but also bring about a certain pusher force on the two driving masses in case of a deflection in the same direction, as can occur due to the effect of an impact on the rate of rotation sensor.

In order to positively affect the properties of the connecting springs and to keep the installed space of the rate of rotation sensor as small as possible, the connecting springs protrude into an intermediate space provided between the two driving masses. The connecting springs are thereby preferably serpentine, in order to be able to generate an elasticity and rigidity in the desired manner.

In a different embodiment of the present invention, the connecting element is disposed between the two driving masses. Even better robustness of the rate of rotation sensor is thereby obtained, because the connection of the two driving masses can be more stable for the different motions of the driving masses toward and opposite each other.

In a particularly advantageous embodiment, the connecting element is a first mass that is connected to the two driving masses by means of springs. Motions of the driving masses out of the X-Y plane can be detected by said first mass, whether for measuring a rate of rotation or for detecting a shock condition of the sensor, if corresponding detecting elements, such as electrodes, are provided. The connecting element is thereby preferably attached to the driving masses by means of springs. Two of said connecting elements are thereby disposed such that they are on opposite sides of the Y-axis. For a drive motion of the driving masses in antiphase, the springs are thereby compressed or stretched, while the connecting element remains unmoved between the two driving masses. For a deflection of the driving masses in antiphase for detecting a rate of rotation, the connecting element is tilted, so that the motion thereof is also detected by means of said detecting elements by changing the electrical voltage, either alone or in conjunction with a change in position of the driving masses. For a deflection of the two driving masses in the same Z-direction, the two connecting elements are displaced together with the driving masses. Said state can also be very clearly determined and analyzed by a corresponding detection of said motion by means of electrical detecting elements.

In order to obtain particularly stable guiding of the driving masses and the connecting element, it is advantageously provided that the first mass encloses a second mass in a frame shape, to which it is connected by means of springs. An additional stability of the connecting elements is thereby obtained, and the deflection of both the driving masses and the frame-shaped first mass and optionally the second mass can be detected.

In order to stabilize the connecting element, it is advantageously provided that the second mass is preferably rotatably attached about the X-axis to the substrate by means of an anchor. For a corresponding design of the mountings and springs, both the driving masses and the first and second masses of the connecting element are deflected for detecting a rate of rotation about the X-axis Because the driving masses in said case are deflected diametrically opposite by the Coriolis force that arises, a tilting motion of the connecting element and the first and second mass thereof about the support of the second mass, or about the X-axis, takes place. If, however, an impact against the sensor occurs, then the two driving masses are deflected in the same direction, and thereby cause the frame-shaped first mass in particular to be displaced, also together with the driving masses, in the Z-direction. The second mass of the connecting element, displaceable only about the X-axis on the anchor, remains largely stationary and causes the frame-shaped first mass to be displaced back into the initial position in the X-Y plane, together with the driving masses. The sensor is thereby stabilized very quickly and reliably after a shock effect.

If detecting elements are disposed between the substrate and the driving masses and/or the first mass and/or the second mass, then the motion of said components out of the X-Y plane can be detected and fed to an analysis device. The detecting thereby takes place particularly in an embodiment of said detecting elements in the form of electrodes disposed on one side on the substrate and on the other side on the side of the components facing the substrate, by changing the electrical voltage whenever the distance between said two electrodes changes. In an advantageous embodiment of the invention, the driving masses are driven by drive elements, particularly comb electrodes. An alternating voltage at the drive elements causes them to bring about an oscillating vibration of the driving mass about the corresponding support or about the Z-axis of the rate of rotation sensor.

In order to achieve synchronization and exact vibration of the driving masses, feedback elements are provided, detecting the oscillating rotary motion of the driving masses and forwarding corresponding signals to a drive controller. A change in the alternating voltage applied to the drive elements can thereby be generated and the oscillation of the driving masses can thereby be influenced.

In a preferable embodiment of the invention, the driving mass is disposed on the central suspension by means of a plurality of anchor springs. The driving masses are thereby stabilized for driving in the X-Y plane, but a targeted and uniform deflection of the driving masses for detecting a rate of rotation as well as for detecting and resisting a shock condition is also generated.

In order to prevent damage to the individual displaced parts, venous stoppers can be provided. Stoppers are thus disposed preferably between the driving masses and/or the first mass and/or the second mass of the connecting element for limiting the displaceability of the masses. The stoppers are typically implemented as embossments or protrusions that can receive an impact from the adjacent mass without damage. Stoppers are also advantageous if disposed between the central suspension and the driving mass. It is thereby particularly advantageous if stoppers are provided between the substrate and/or the driving mass and/or the connecting springs. Said stoppers must be very strongly attached to the substrate and bring about a limit to the displacement of the driving mass and/or the connecting or anchor springs.

BRIEF DESCRIPTION OF THE DRAWINGS

Further advantages of the invention are described in the following embodiment examples. Shown are.

DETAILED DESCRIPTION OF THE PREFERRED EMBODIMENTS

Figure 1:
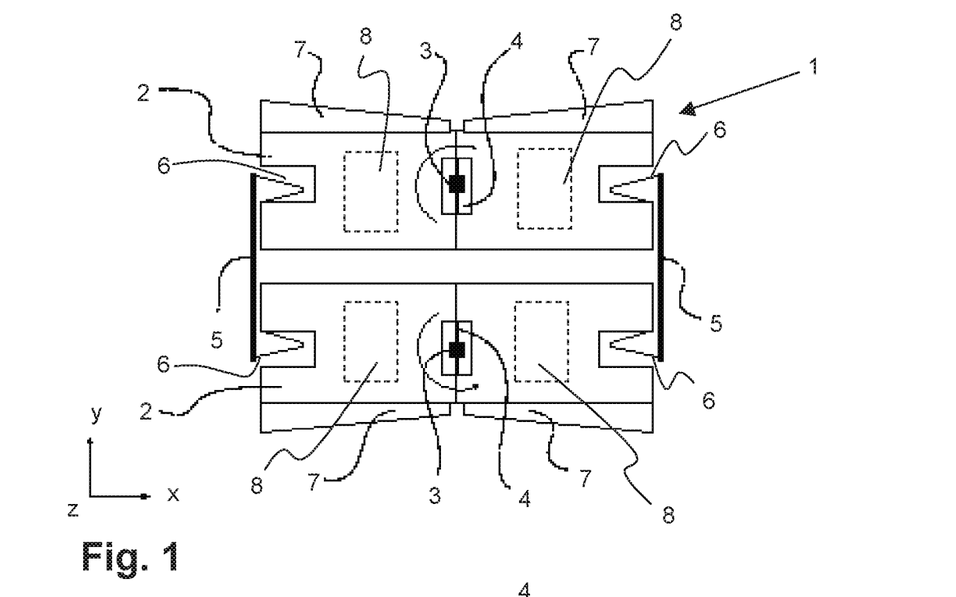
FIG. 1 a first embodiment having connecting elements disposed externally on the driving masses, FIG. 2 a second embodiment of the invention having connecting elements partially disposed between the driving masses.

The embodiment of FIG. 1 shows a sketch of a plan view of a micromechanical Coriolis rate of rotation sensor 1 according to the invention having two driving masses 2. The driving masses 2 are disposed parallel to a substrate, not shown here, located within the plane of the drawing. The driving masses 2 are each connected to the substrate by means of an anchor 3 and anchor springs 4 disposed thereon. The anchor springs 4 allow rotation about a Z-axis in an orthogonal coordinate system. In said coordinate system, the Z-axis protrudes out of the plane of the drawing, while the X-axis is disposed in the longitudinal direction of the driving masses 2 and the Y-axis is disposed in the transverse direction of the driving masses 2. The X-axis is thereby the measurement axis, meaning that the rate of rotation sensor is able to determine a rotation of the sensor or the substrate about the X-axis. The Y-axis disposed orthogonal thereto and in the same plane represents the detection axis. The driving masses 2 move accordingly about the Y-axis, out of the X-Y plane, when the substrate is rotated about the measurement or X-axis. This takes place due to a Coriolis force that arises when the driving masses 2 oscillate about the drive axis thereof or the Z-axis. Said displacements are made possible by the central suspension of the driving masses 2 on the anchor 3 and the anchor springs 4 disposed thereon and connected to the driving masses 2. The anchor springs 4 are accordingly implemented such that they allow the rotary motion of the driving masses 2 about the anchor 3 in question or about the Z-axis, and also allow pivoting of the driving masses 2 about the Y-axis. They are rigid about the X-axis, in contrast, so that no displaceability arises here, as a rule.

It should be noted here that the direction out of the plane of the drawing is referred to as the Z-axis in the above description. The X-axis refers to a direction transverse to the plane of the drawing, and the Y-axis refers to a direction along the plane of the drawing. This also applies for cases where the axes are shifted parallel to each other.

The two driving masses 2 are connected to each other by means of a connecting element 5 and connecting springs 6. One connecting element 5 having the associated connecting springs 6 is disposed at each end of each driving mass 2 in the X-direction. The connecting element 5 and the connecting springs 6 bring about a synchronization of the rotary motions of the driving masses 2. This ensures that, when the two driving masses 2 oscillate in antiphase, that is, so that the two ends of the driving masses 2 facing toward each other move toward each other or away from each other, said masses oscillate at the same frequency, so that a stable system arises, wherein the deflections of the two driving masses 2 result in the same amplitude out of the X-Y plane in case of detecting a rate of rotation of the sensor about the X-axis. The connecting springs 6 are thereby implemented so that they allow deflection in the X-Y plane, as well as a pivoting motion of the driving masses 2 about the Y-axis, wherein the motions of both connecting springs of a connecting element occur in opposite directions for a deflection out of the X-Y plane, while they occur in the same direction for an antiphase motion of the driving masses 2 within the X-Y plane.

In order to be able to rotate the driving masses 2 about each anchor 3 or the Z-axis, drive elements 7 are provided. The drive elements 7 are associated with the driving masses 2 and consist of comb electrodes, for example, that are supplied with an alternating voltage, whereby the driving masses 2 are induced to rotate about the anchor 3. The rotary motion thereby alternates according to the polarity of the comb electrodes, that is, it oscillates, so that an oscillating motion about the anchor 3 takes place.

Detecting elements 8 are disposed between the substrate and the driving masses 2. The detecting elements 8 are, for example, plate capacitors, the electrodes thereof being disposed on the substrate and, opposite thereof, on the side of the driving masses 2 facing the substrate. For a rotary motion of the driving masses 2 about the Y-axis, the distance between the opposing electrodes of the detecting elements 8 changes, whereby a changed electrical signal is generated. Said electrical signal is symptomatic of the deflection of the driving masses 2 and thus in turn for the rotary motion of the substrate about the X-axis. The rate of rotation of the rate of rotation sensor can thereby be determined by analyzing said electrical signal of the detecting elements 8.

Figure 2:
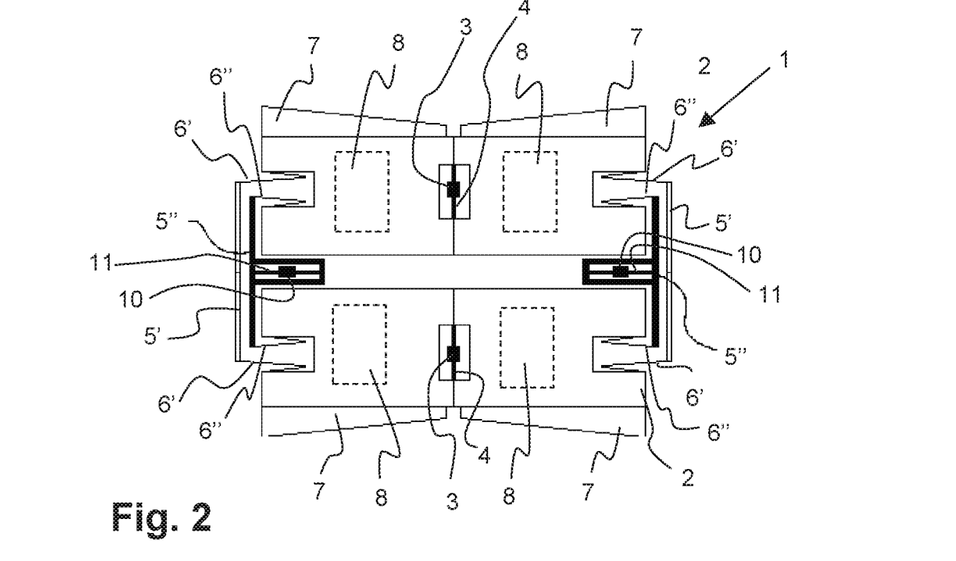

A further embodiment example of the present invention is shown in FIG. 2. The corresponding sketch shows a rate of rotation sensor 1 constructed similarly to the embodiment of FIG. 1. The driving masses 2 are rotatably attached about the Y-axis and the Z-axis to the substrate, not shown, by means of an anchor 3 and anchor springs 4. The driving masses 2 are driven by means of drive elements 7 and the deflection thereof out of the X-Y plane is detected by means of detecting elements 8.

Figure 4:
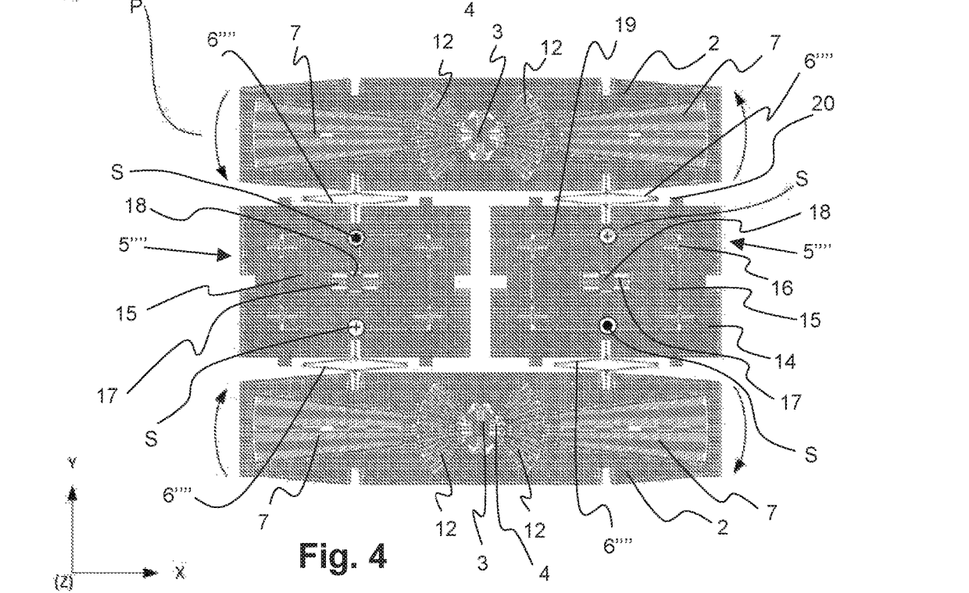
FIG. 4 a further embodiment of the present invention, having connecting elements disposed between the two driving masses, FIG. 5a the embodiment according to FIG. 4, with the driving masses oscillating in antiphase, FIG. 5b the embodiment according to FIG. 4, with the driving masses oscillating in phase, and FIG. 5c having a deflection of the driving masses and the connecting elements in antiphase.

A difference from the embodiment of FIG. 1 is the type of the connecting element 5. In the embodiment of FIG. 4, the connecting element 5' is divided in two on each side. While the connecting element 5', together with the connecting springs 6' disposed thereon, connects the two driving masses 2 in a manner similar to the connecting element 5 of FIG. 1, an additional connecting element 5" is provided. The connecting element 5" is attached to each of the driving masses 2 by means of connecting springs 6". The connecting element 5" is further attached to the substrate by means of an anchor 10 and anchor springs 11. The anchor springs 11 are implemented for allowing a rotary motion about the Z-axis as well as a rotary motion of the connecting elements 5' and 5" about the X-axis. Such an arrangement of the connecting elements 5' and 5" is particularly advantageous if the driving masses 2 are drive in phase rather than in antiphase. Rotary motions of the driving masses 2 are also caused thereby, leading to a tilting motion about the Y-axis in case of a rate of rotation about the X-axis. Because the rotary oscillations about each anchor 3 of the driving masses 2 occur in phase in this case, the deflection of the driving masses 2 due to a Coriolis force can also be expected to be in phase. This means that both driving masses 2 tilt up and down about the Y-axis in the same side region of the Y-axis at the same time. Operation of the rate of rotation according to the invention is also possible in this mode, even if the robustness of the sensor and the detection of impacts on the rate of rotation sensor is thereby not as advantageous as for the antiphase motion of the driving masses 2.

Figure 3:
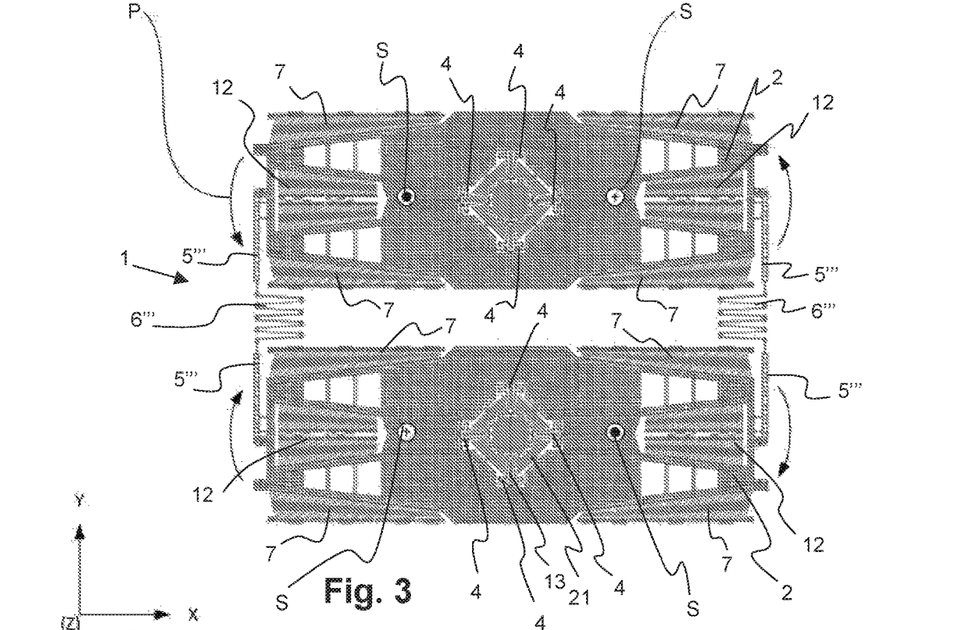
FIG. 3 a rate of rotation sensor according to the invention, similar to FIG. 1.

A further embodiment example of the present invention is shown in FIG. 3. Said embodiment is, in turn, similar to the embodiment of FIG. 1. In addition to various differences, a detailed representation is selected in particular here. The driving masses 2 are each attached to the anchor 3 by means of four anchor springs 4. This allows a uniform rotary motion of the driving masses 2 about the anchor 3 or the Z-axis, for driving the same according to the arrows P. The driving motion of the driving masses 2 takes place in turn in the X-Y plane. Comb electrodes of the driving elements 7 provide the drive of the driving masses 2. The driving elements 7 consist of a stationary part fixed to the substrate and a second part, wherein the comb electrodes are attached to the displaceable driving masses 2. The two parts of the driving elements 7 engage in each other and lead to a rotary motion of the driving masses 2 about the anchor 3. In order to be able to determine and optionally correct the rotary motions of the driving masses 2 caused by the driving elements 7, feedback elements 12 are provided. The feedback elements 12 also consist of comb electrodes. Said comb electrodes, engaging in each other, of which in turn a first part is attached to the substrate and a second part is displaced together with the driving mass 2, determine the frequency at which the driving masses 2 oscillate about the Z-axis by means of a corresponding change in the electrical voltage. If differences between the actual and target frequency are thereby determined, then the frequency of the driving masses 2 can be changed accordingly by correspondingly influencing the driving elements 7, in order to correspond in turn to the target frequency. The feedback elements 12 are each disposed between two driving elements 7. They thereby comprise nearly the same distance from the axis of rotation Z, and can thus operate at a similar precision as the driving elements 7.

The two driving masses 2 are connected to a connecting element 5''' at each end thereof, as seen in the X-direction. The connecting elements 5''' are implemented in the form of cantilevers disposed fixedly on the driving mass 2. A connecting spring 6''' is disposed between the two cantilevers of the connecting elements 5'''. The connecting spring 6''' protrudes into an intermediate space between the two driving masses 2 and is serpentine in form. The connecting elements 5''', together with the connecting springs 6''' allow displacement of the driving masses 2 in antiphase within the X-Y plane, as well as deflection of the driving masses 2 out of the X-Y plane for detecting a rate of rotation. This also occurs in antiphase. The rotary motions of the driving masses 2 out of the X-Y plane are shown by means of arrow symbols S. The rotary motion also takes place in antiphase, analogous to the drive motion of the driving masses 2.

Stoppers are provided in order to prevent damage to the driving masses 2 or other elements. In the embodiment of FIG. 3, Stoppers 13 are attached to the substrate and protrude into the region of the anchor springs 4. The anchor springs 4 would strike against the stoppers 13 in case of excessive deflection of the driving masse 2, and thus prevent damage to the driving masses 2 or the springs 4 by excessive bending.

In addition to good rotary motion of the driving masses 2 about the Z-axis, good shock stability is achieved by attaching the driving masses 2 to the anchor 3 by means of four anchor springs 4. The driving masses 2 can thereby tilt about both the X-axis and the Y-axis for a corresponding impact on the sensor 1. Said motion of the driving masses 2 in the same direction in case of an impact can be determined by the detecting elements, not shown here but implemented similarly to those in FIGS. 1 and 2. The determination is made in that, instead of the opposing approach and separation of the individual electrodes of the detecting elements 8 expected in normal operation, a separation or approach takes place in the same direction. If such is detected, then a shock condition is assumed, so that the measurement results that are supposed to determine a rate of rotation of the sensor 1 must be cleansed or discarded.

A further embodiment example is shown in FIG. 4. The embodiment of FIG. 4 is most suitable for being able to eliminate shock conditions, and for protecting the sensor 1 against damage. In the embodiment shown here, the two driving masses 2 are disposed at a relatively great distance from each other. The two anchors 3 are located along the Y-axis and allow a rotary motion about the anchor 3 in a similar manner to the previous embodiments, together with the drive elements 7, the feedback elements 12, and the corresponding anchor springs 4. When a Coriolis force occurs due to a rate of rotation and acts on the sensor 1 about the X-axis, the driving masses 2 are deflected in turn about the Y-axis and out of the X-Y plane.

Said rotary motions of the driving masses 2 out of the X-Y plane are shown by means of arrow symbols S. The rotary motion takes place in antiphase, analogous to the drive motion of the driving masses 2.

The driving masses 2 of said embodiment comprise connection elements 5'''' there between. The connecting elements 5'''' are connected to the driving masses 2 by means of connecting springs 6''''. The connecting element 5'''' consists of a first mass 14 and a second mass 15. The first mass 14 encloses the second mass 15 in a frame-like manner and is connected to the driving masses 2 by means of the connecting springs 6''''. The first mass 14 is also connected to the second mass 15 by means of further connecting springs 16. The connecting springs 16 allow displaceability of the first mass 14 relative to the second mass 15 in the X-Y plane. Displaceability of the first mass 14 in the Y-direction is thereby made possible. The connecting springs 6'''' are rigid in the X-direction and the Z-direction, so that motion of the driving masses 2 simultaneously brings about motion of the first mass 14 and of the second mass 15 by means of the connecting springs 16.

The second mass 15 is disposed on a further anchor 18 by means of springs 17. The spring 17 is designed such that a rotary motion is possible about the X-axis. It is thus ensured that, for a deflection of the driving masses 2 out of the X-Y plane, tilting of the connecting elements 5'''' about the anchor 18 or the X-axis can occur. Detecting elements that can detect the change in distance between the driving masses 2 and the connecting elements 5'''', particularly the first masses 14 and the second masses 15, are disposed between the driving masses 2 and/or the connecting elements 5'''' and the substrate. The corresponding rotary motion is shown by the arrow symbols S.

Stoppers 19 are disposed between the first mass 14 and the second mass 15, preventing damage to the spring elements or the first or second mass in case of excessive deflection. The same applies to the stoppers 20 disposed on the exterior of the first mass 14. Said stoppers prevent the driving masses 2 and the first mass 14, and the connecting springs 6'''' disposed there between, from being damaged.

If a shock condition arises on sensor 1, then the driving masses 2 do not tilt out of the X-Y plane in the opposite direction, as would occur due to the driving elements 7. Rather, the two driving masses 2 tilt out of the X-Y plane in the same direction. As soon as this is the case, the first mass 1 is also displaced out of the X-Y plane provided therefore, while the second mass 15 remains unchanged, due to the spring characteristics of the spring 17. The first mass 14 is thus displaced by the connecting springs 16 relative to the second mass 15 largely in parallel to the X-Y plane and out of the same, and approaches or departs from the substrate. This can, in turn, be determined by a change in the electrical signals by the detecting elements 8 disposed between the first mass 14 and the substrate.

The construction of the rate of rotation sensor 1 as shown provides a particularly stable and shock-resistant construction of a rate of rotation sensor 1. False measurements due to detectable shock conditions can also be very reliably prevented.

Figure 5A:
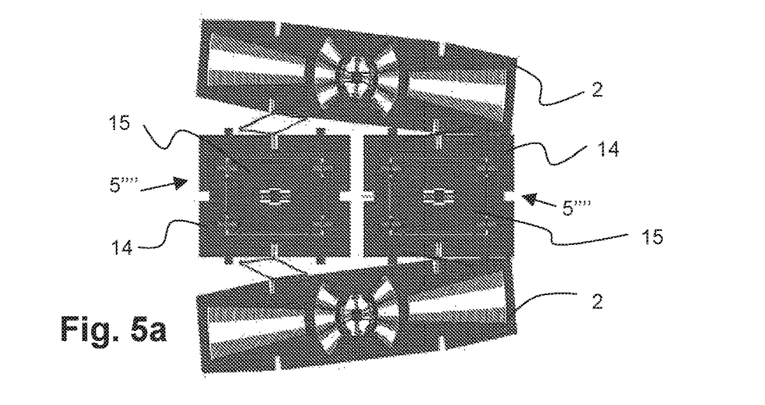
Figure 5B:
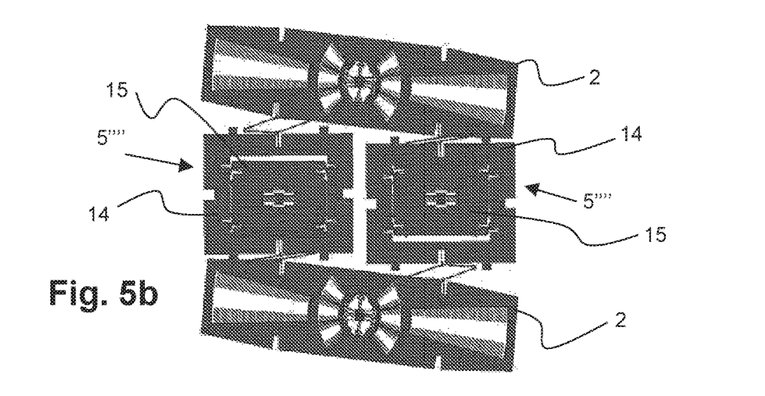
Figure 5C:
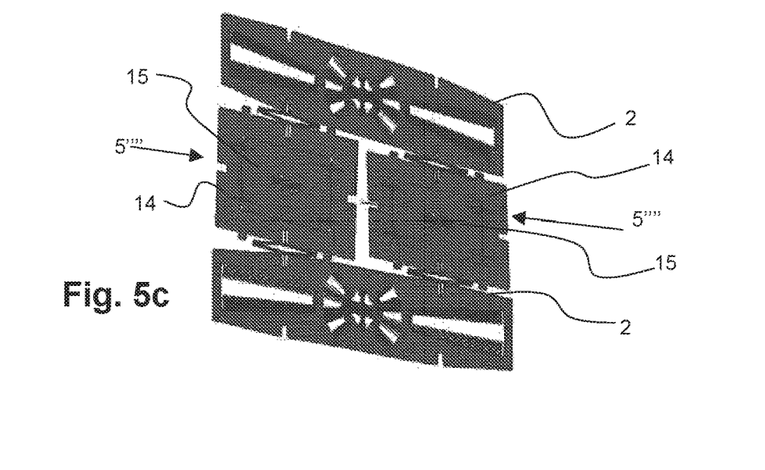

Different conditions of the rate of rotation sensor 1 of FIG. 4 are shown in FIGS. 5*a*, 5*b*, and 5*c*. FIG. 5*a* thereby shows an antiphase motion of the driving masses 2. It is evident that the driving masses 2 are displaced about the anchor 3 in a clockwise and counterclockwise direction. The feedback elements 12 are disposed near the anchor 3. The connecting elements 5'''' remain essentially stationary.

According to FIG. 5*b*, operation of the rate of rotation sensor 1 in phase is shown. The two driving masses 2 thereby pivot in the same direction, clockwise or counterclockwise. A force is thereby exerted on the first mass 14 of the connecting element 5'''', so that said first mass 14 is displaced relative to the second mass 15. The displacement of all of said elements takes place within the X-Y plane.

According to FIG. 5*c*, a rate of rotation about the X-axis occurs, whereby Coriolis forces arise that act on the driving masses 2. The deflection according to FIG. 5*c* takes place in the opposite direction, from which it can be concluded that the driving masses 2 are also driven in antiphase. The tilting of the driving masses 2 in opposite direction about the Y-axis causes the connecting elements 5'''' to tilt as well. Because said elements can be rotated only about the X-axis due to the anchors 18 and the springs 17, the connecting elements 5'''' tilt about the X-axis along the two anchors 18. A change in the distance from the connecting elements 5'''' thereby occurs with respect to the substrate located below. The detecting elements 8 disposed there between, not shown here, can detect said change in distance by means of a change in the electrical signals, and a corresponding rate of rotation of the rate of rotation sensor about the X-axis is thereby detected.

The invention is not limited to the embodiments shown. In particular, the invention is not limited to the forms of the individual components shown, to the extent that said forms do not arise from the claims. Changes to the scope of the disclosure and the applicable claims may be made at any time.

What is claimed is:

1. A micromechanical sensor comprising:
    a substrate having a measurement axis and a detection axis that are disposed orthogonally to each other;
    a first driving mass and a second driving mass disposed in a plane containing the measurement and detection axes, each of the first and second driving masses being rotatably coupled to the substrate via a central suspension that is disposed on the detection axis;
    drive electrodes that generate rotary motions in each of the first and second driving masses about a drive axis thereof, the drive axis of each of the first and second driving masses being disposed orthogonally to the measurement and detection axes, the rotary motions causing the first and second driving masses to deflect in opposite directions in response to a rate of rotation about the measurement axis; and
    at least one elastic connecting element having a primary axis that extends in a direction parallel to the detection axis, the at least one elastic connecting element being coupled to each of the first and second driving masses such as to synchronize the rotary motions thereof by allowing the first and second driving masses to deflect in opposite directions in response to a rate of rotation about the measurement axis but deflect in a same direction in response to a shock condition.

2. The micromechanical sensor according to claim 1, wherein the at least one elastic connecting element is attached at the outermost end of each of the first and second driving masses in the direction of the measurement axis.

3. The micromechanical sensor according to claim 1, wherein the at least one elastic connecting element comprises a cantilever and an elastic connecting spring.

4. The micromechanical sensor according to claim 3, wherein the elastic connecting spring protrudes into an intermediate space between the first and second driving masses.

5. The micromechanical sensor according to claim 1, wherein the at least one elastic connecting element is disposed between the first and second driving masses.

6. The micromechanical sensor according to claim 1, wherein the at least one elastic connecting element is a first mass that is coupled to the first and second driving masses via connecting springs.

7. The micromechanical sensor according to claim 6, wherein the first mass encloses a second mass and is coupled thereto by means of springs.

8. The micromechanical sensor according to claim 7, further comprising detection elements that are disposed between the substrate and at least one of the first driving mass, the second driving mass, the first mass, and the second mass.

9. The micromechanical sensor according to claim 1, wherein the at least one elastic connecting element is rotatably coupled about the measurement axis to the substrate via an anchor.

10. The micromechanical sensor according to claim 1, further comprising drive elements disposed on the first and second driving masses.

11. The micromechanical sensor according to claim 10, further comprising feedback elements that detect the rotary motions and output control signals to a drive controller.

12. The micromechanical sensor according to claim 1, wherein the first and second driving masses are disposed on the central suspension via a plurality of anchor springs.

13. The micromechanical sensor according to claim 7, further comprising stoppers that limit the displaceability of the first and second driving masses, the first mass and the second mass being disposed between the first and second driving masses and the first mass or between the first mass and the second mass.

14. The micromechanical sensor according to claim 1, further comprising stoppers disposed between the central suspension and at least one of the first and second driving masses.

15. The micromechanical sensor according to claim 12, further comprising stoppers disposed between the substrate and the first and second driving masses or between the substrate and the anchoring springs.

16. The micromechanical sensor according to claim 7, wherein the second mass is rotatably coupled about the measurement axis to the substrate via an anchoring.

17. The micromechanical sensor according to claim 12, wherein the anchor springs are rigid about the measurement axis and allow a rotation about the detection axis and the drive axis.

18. A method to determine a rate of rotation, the method comprising:
    in a micromechanical sensor having a measurement axis, a detection axis, and a drive axis that are disposed orthogonally to each other, driving a first driving mass and a second driving mass to generate rotary motions in each of the first and second driving masses about a drive axis thereof; and in response to a rotation about the measurement axis, detecting a motion about the detection axis; and synchronizing the rotary motions by coupling to each of the first and second driving masses an elastic connecting element that has a primary axis that extends in a direction parallel to the detection axis, the elastic connecting element allowing the first and second driving masses to deflect in opposite directions in response to a rate of rotation about the measurement axis but deflect in a same direction in response to a shock condition.

19. The method according to claim 18, wherein the deflection of the first and second driving masses in the same direction in response to the shock condition reduces sensitivity due to impact.

20. The method according to claim 18, wherein the elastic connecting element comprises springs that are compressed in a manner such that the first and second driving masses oscillate at a same frequency and are deflected at a same amplitude.

* * * * *